(12) United States Patent
Najdenovski

(10) Patent No.: US 7,730,414 B2
(45) Date of Patent: Jun. 1, 2010

(54) GRAPHICAL DISPLAY

(75) Inventor: Robert Najdenovski, Eslov (SE)

(73) Assignee: Sony Ericsson Mobile Communications AB, Lund (SE)

( * ) Notice: Subject to any disclaimer, the term of this patent is extended or adjusted under 35 U.S.C. 154(b) by 272 days.

(21) Appl. No.: 11/466,967

(22) Filed: Aug. 24, 2006

(65) Prior Publication Data

US 2008/0005688 A1 Jan. 3, 2008

Related U.S. Application Data

(60) Provisional application No. 60/806,419, filed on Jun. 30, 2006.

(51) Int. Cl.
*G06F 3/048* (2006.01)
(52) U.S. Cl. ............... 715/765; 715/727; 715/716
(58) Field of Classification Search ............... 715/765, 715/864; 345/440
See application file for complete search history.

(56) References Cited

U.S. PATENT DOCUMENTS

| | | | | |
|---|---|---|---|---|
| 2002/0170415 | A1* | 11/2002 | Hruska et al. | 84/609 |
| 2003/0014262 | A1* | 1/2003 | Kim | 704/278 |
| 2003/0050058 | A1* | 3/2003 | Walsh et al. | 455/426 |
| 2003/0112262 | A1* | 6/2003 | Adatia et al. | 345/716 |
| 2003/0112823 | A1* | 6/2003 | Collins et al. | 370/474 |
| 2003/0174173 | A1 | 9/2003 | Nishiyama et al. | |
| 2003/0186708 | A1* | 10/2003 | Parulski et al. | 455/456.1 |
| 2004/0192331 | A1* | 9/2004 | Gorday et al. | 455/456.1 |
| 2004/0268451 | A1* | 12/2004 | Robbin et al. | 999/999.999 |
| 2005/0143915 | A1* | 6/2005 | Odagawa et al. | 701/211 |
| 2006/0071918 | A1* | 4/2006 | Mori et al. | 345/184 |
| 2006/0136340 | A1* | 6/2006 | Park | 705/52 |
| 2006/0202994 | A1* | 9/2006 | Chevallier et al. | 345/440 |
| 2006/0224260 | A1* | 10/2006 | Hicken et al. | 700/94 |
| 2006/0224761 | A1* | 10/2006 | Howarth et al. | 709/231 |
| 2007/0070186 | A1* | 3/2007 | Fujimori et al. | 348/14.03 |
| 2007/0150840 | A1* | 6/2007 | Olcott et al. | 715/854 |
| 2007/0168419 | A1* | 7/2007 | Sciammarella | 709/204 |
| 2007/0204227 | A1* | 8/2007 | Kretz | 715/727 |
| 2007/0281668 | A1* | 12/2007 | Fleming | 455/414.1 |

FOREIGN PATENT DOCUMENTS

WO  WO 2005/006163  1/2005

OTHER PUBLICATIONS

PCT/IB2006/055040 International Search Report with Written Opinion, Jun. 19, 2007, 9 pages.
International Preliminary Report on Patentability issued in corresponding international application No. PCT/IB2006/055040, dated Sep. 24, 2008, 5 pages.

* cited by examiner

*Primary Examiner*—William L Bashore
*Assistant Examiner*—Daeho D Song
(74) *Attorney, Agent, or Firm*—Harrity & Harrity, LLP

(57) ABSTRACT

A device may include logic configured to store a number of media files. The media files may include audio files, video files, image files or multimedia files. The device may also include a display configured to display a graphical representation illustrating information associated with the media files.

16 Claims, 14 Drawing Sheets

| TITLE 310 | ARTIST 320 | COUNTRY 330 | YEAR 340 | GENRE 350 | TEMPO 360 | LENGTH 370 | SNIPPET 380 |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

FIG. 3

GRAPHICAL DISPLAY

RELATED APPLICATION

This application claims priority under 35 U.S.C. §119 based on U.S. Provisional Application No. 60/806,419, filed Jun. 30, 2006, the disclosure of which is hereby incorporated herein by reference.

TECHNICAL FIELD OF THE INVENTION

The invention relates generally to providing information and, more particularly, to providing information for display.

DESCRIPTION OF RELATED ART

Devices that play media content, such as music, video and/or multimedia content, are becoming increasingly common in every day life. For example, media players are often used at home, at work and during travel. These devices have therefore become increasingly important to users.

SUMMARY

According to one aspect a device may include logic configured to store a plurality of files, the files comprising at least one of audio, video or multimedia files. The device may also include a display configured to display a graphical representation illustrating information associated with the plurality of media files.

Additionally, the graphical representation may comprise a graph, a first axis of the graph being associated with a first item of information and a second axis of the graph being associated with a second item of information.

Additionally, the plurality of files may comprise songs and the first and second items of information may each comprise at least one of one of a genre of music, a tempo, an artist or a year.

Additionally, the device may further comprise an input device configured to receive input from a user identifying at least a portion of the plurality of songs represented in the graph, and wherein the display may be further configured to generate a playlist based on the identified portion of the plurality of songs.

Additionally, the input from the user may comprise graphical input enclosing a number of points illustrated in the graph.

Additionally, the input received from the user may comprise input highlighting a number of points illustrated in the graph.

Additionally, the plurality of files may comprise songs and the device may further comprise an input device configured to receive input from the user identifying a first song. The logic may be further configured to begin playing a portion of the first song at a chorus portion of the first song in response to the input from the user.

Additionally, the plurality of files may comprise songs and the device may futher comprise an input device configured to receive input from the user identifying a first song. The logic may be further configured to begin playing a portion of the first song at a point other than a start of the first song.

Additionally, the logic may be further configured to generate a playlist based on input from a user, the playlist comprising at least one of a bar graph, a pie chart, a calendar or a timeline.

Additionally, the logic may be further configured to display at least some of the songs in the playlist using visual indicators.

Additionally, the visual indicators may comprise at least one of color, highlighting or bolding.

Additionally, the graphical representation may comprise dots, stars or geometrical shapes, each of the dots, stars or geometrical shapes representing a song or album.

Additionally, the graphical representation may comprise a map, the map including indicators representing the plurality of media files.

Additionally, the graphical representation may comprise artwork associated with the plurality of media files.

Additionally, the device may comprise a mobile telephone.

Additionally, the logic may be further configured to provide a link to a music vendor.

According to another aspect, a method may comprise storing a plurality of media files and outputting a graphical representation illustrating at least two pieces of information associated with each of the plurality of media files.

Additionally, the graphical representation may comprise a graph, a first axis of the graph being associated with a first piece of information and a second axis of the graph being associated with a second piece of information.

Additionally, the method may further comprise receiving a selection from a user identifying a first media file in the graphical representation and playing a portion of the first media file, the portion not including a starting portion of the first media file.

According to a further aspect, a computer-readable medium having stored thereon a plurality of sequences of instructions is provided. The instructions, when executed by at least one processor, cause the processor to identify a portion of a first song representing a chorus of the first song and store information identifying a starting point for playing the portion of the first song.

Additionally, the instructions may further cause the processor to receive input from the user identifying the first song and begin playing the first song at the portion representing the chorus of the first song in response to the received input.

According to still another aspect, a device may comprise means for storing a plurality of files. The device may also comprise means for generating a graph illustrating information associated with each of the plurality of files, a first axis of the graph being associated with a first item of information and a second axis of the graph being associated with a second item of information. The device may further comprise means for outputting the graph to a display.

Additionally, the plurality of files may comprise at least one of music files, video files, image files, multimedia files or video games.

According to yet another aspect a method for generating a playlist may comprise displaying a plurality of media files as data points on a multi-dimensional graph and selecting at least some of the data points to obtain the playlist.

Additionally, the multi-dimensional graph may comprise at least one of a three dimensional graph or a four dimensional graph.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 3 illustrates an exemplary database stored in the system of FIG. 1;

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
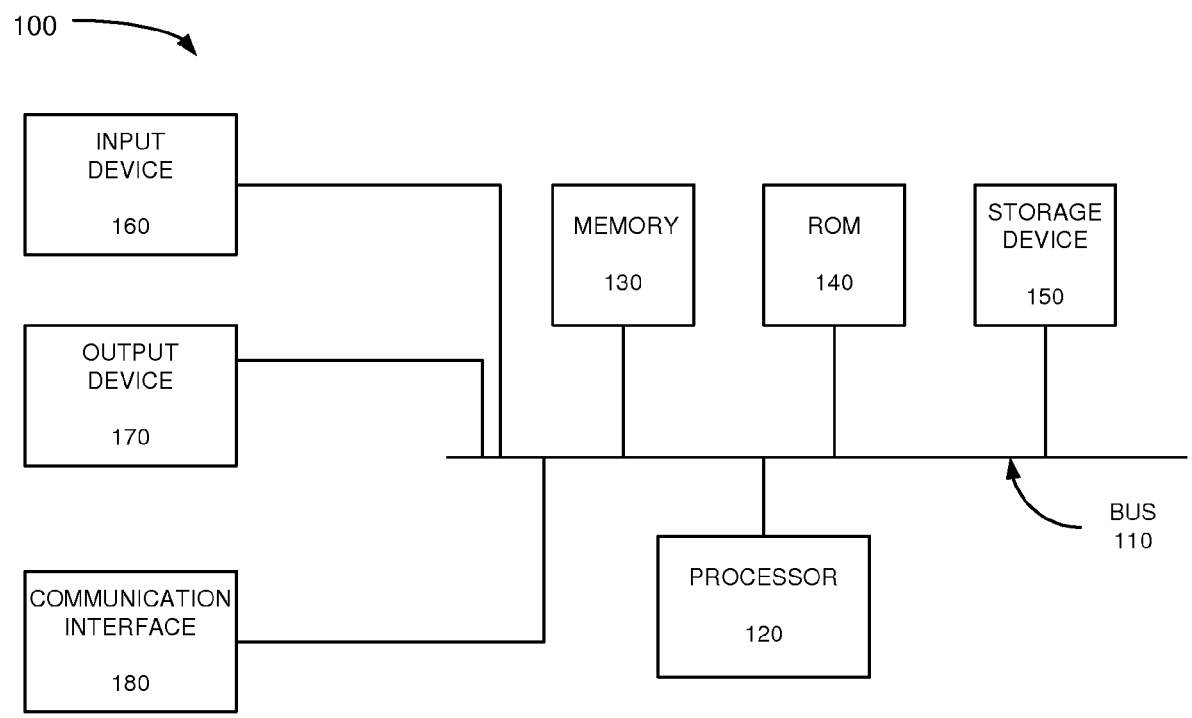
FIG. 1 is a diagram of an exemplary system in which methods and systems described herein may be implemented.

FIG. 1 is a diagram of an exemplary system 100 in which methods and systems described herein may be implemented. System 100 may include a bus 110, a processor 120, a memory 130, a read only memory (ROM) 140, a storage device 150, an input device 160, an output device 170, and a communication interface 180. Bus 110 permits communication among the components of system 100. System 100 may also include one or more power supplies (not shown). One skilled in the art would recognize that system 100 may be configured in a number of other ways and may include other or different elements.

Processor 120 may include any type of processor or microprocessor that interprets and executes instructions. Processor 120 may also include logic that is able to decode media files, such as audio files, video files, multimedia files, image files, video games, etc., and generate output to, for example, a speaker, a display, etc. Memory 130 may include a random access memory (RAM) or another dynamic storage device that stores information and instructions for execution by processor 120. Memory 130 may also be used to store temporary variables or other intermediate information during execution of instructions by processor 120.

ROM 140 may include a conventional ROM device and/or another static storage device that stores static information and instructions for processor 120. Storage device 150 may include a magnetic disk or optical disk and its corresponding drive and/or some other type of magnetic or optical recording medium and its corresponding drive for storing information and instructions. Storage device 150 may also include a flash memory (e.g., an electrically erasable programmable read only memory (EEPROM)) device for storing information and instructions.

Input device 160 may include one or more conventional mechanisms that permit a user to input information to system 100, such as a keyboard, a keypad, a directional pad, a mouse, a pen, voice recognition and/or biometric mechanisms, etc.

Output device 170 may include one or more conventional mechanisms that output information to the user, including a display, a printer, one or more speakers, etc. Communication interface 180 may include any transceiver-like mechanism that enables system 100 to communicate with other devices and/or systems. For example, communication interface 180 may include a modem or an Ethernet interface to a LAN. Alternatively, or additionally, communication interface 180 may include other mechanisms for communicating via a network, such as a wireless network. For example, communication interface may include a radio frequency (RF) transmitter and receiver and one or more antennas for transmitting and receiving RF data.

System 100, consistent with the invention, provides a platform through which a user may play and/or view various media, such as music files, video files, image files, games, multimedia files, etc. System 100 may also display information associated with the media played and/or viewed by a user of system 100 in a graphical format, as described in detail below. According to an exemplary implementation, system 100 may perform various processes in response to processor 120 executing sequences of instructions contained in memory 130. Such instructions may be read into memory 130 from another computer-readable medium, such as storage device 150, or from a separate device via communication interface 180. It should be understood that a computer-readable medium may include one or more memory devices or carrier waves. Execution of the sequences of instructions contained in memory 130 causes processor 120 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

Figure 2:
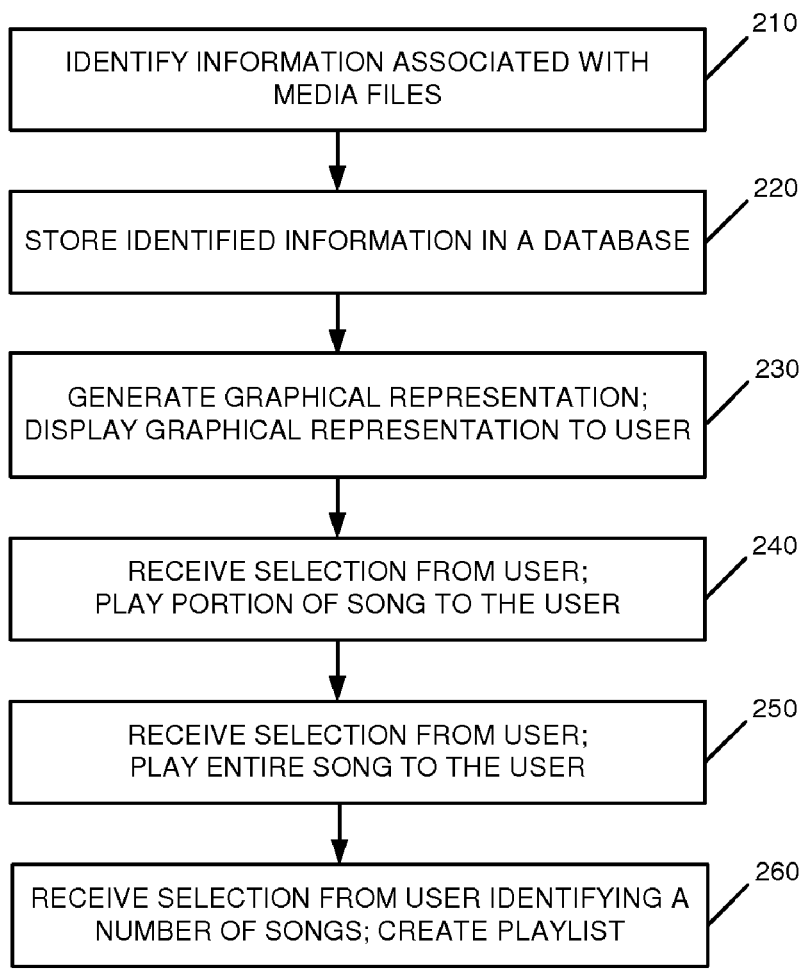
FIG. 2 is a flow diagram illustrating exemplary processing by the system of FIG. 1.

FIG. 2 is a flow diagram illustrating exemplary processing by system 100. Processing may begin when system 100 powers up. Assume that the user of system 100 has stored a number of media files, such as music files in system 100. The media files may be include, for example, MPEG audio layer 3 (MP3) files, wav files, etc. The media files may be stored on, for example, storage device 150.

In one implementation, assume that system 100 stores a number of music files or songs. In this implementation, processor 120 may identify information associated with each song stored in system 100 (act 210). For example, the music file for a song may include tag data or metadata that includes information about the particular song, such as the title, artist/group, a country associated with the artist/group, the year the song was recorded, the genre of the song (e.g., rock, pop, jazz), a tempo of the song (e.g., beats per minute), the length of the song, etc. Processor 120 may store the identified information in a database (act 220).

For example, FIG. 3 illustrates an exemplary database for storing information associated with songs stored in and/or played by system 100. Referring to FIG. 3, database 300 may include a title field 310, an artist field 320, a country field 330, a year field 340, a genre field 350, a tempo field 360, a length field 370 and a snippet field 380. It should be understood that database 300 may include additional fields and/or other fields associated with songs/music. Database 300 may be stored in memory 130, memory 140, storage device 150 or in another memory accessible to system 100. As new songs are stored in system 100 and/or played by system 100, processor 120 may automatically identify the various data illustrated in FIG. 3 for the new song using, for example, the metadata associated with the song, and store this information in database 300.

In an exemplary implementation, processor 120 may also identify a portion of the song that is likely to be identifiable by a listener. For example, processor 120 may identify where the chorus portion of the song begins. In some implementations, specialized software may be used to analyze the song, such as the lyrics, and identify the chorus. The chorus portion of the song may be more memorable to the listener than the beginning portion of the song and is often easily identified by a listener as being associated with a particular song. Processor 120 may store the location of the chorus (e.g., as a number of seconds from the beginning of the song) in snippet field 380 of database 300. In other implementations, processor 120 may store information in snippet field 380 that identifies where the title of the song first occurs in the lyrics, where a particular "hook line" of a song starts, etc. The hook line may identify a line of the song that is easily identified by the listener as being associated with the particular song.

In each case, the information stored in snippet field 380 may then be used by system 100 to allow the user to preview a song by playing a short snippet of the song, as described in more detail below.

Figure 4A:
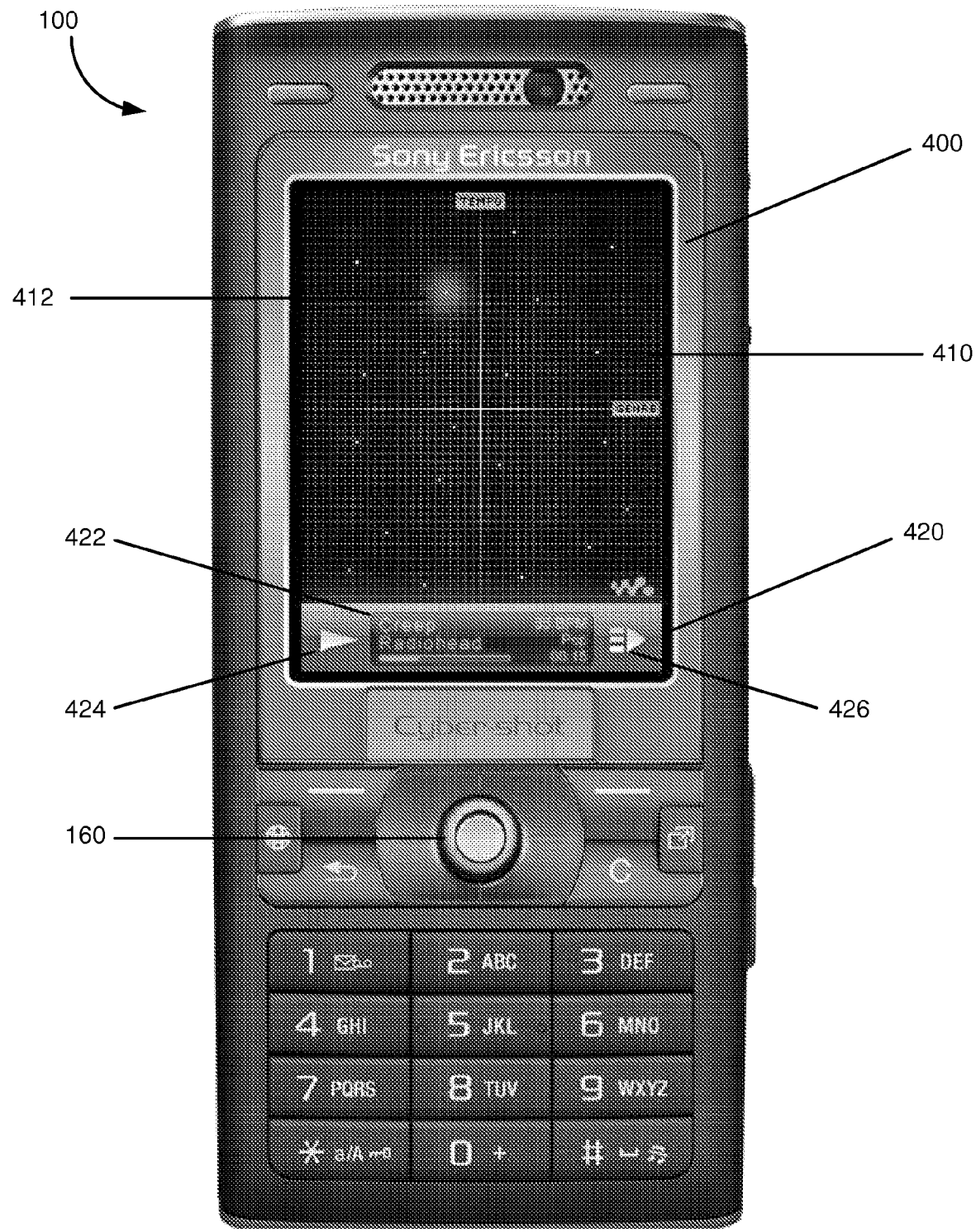
FIGS. 4A-4C illustrate exemplary graphical displays provided by the system of FIG. 1.

Processor 120 may also generate a graphical representation associated with the information stored in database 300 and display the graphical representation to a user (act 230). For example, FIG. 4A illustrates an exemplary graphical representation 400 generated by processor 120 and displayed to a user. In this example, system 100 is a mobile telephone capable of transmitting and receiving telephone calls and also playing media files. Referring to FIG. 4A, graphical representation 400 includes a visual display portion 410 and a controls portion 420. Display portion 410, also referred to herein as display 410, may include a graph or some representation that graphically displays information to a user. Graphical representation 400 may also include a controls area 420 that acts as a display within a display. In this implementation, controls area 420 includes a text window 422, a play button 424 and a stop/skip button 426. The controls in area 420 may be activated via, for example, touch sensitive controls.

In the example illustrated in FIG. 4A, the x-axis of display 410 is labeled as genre and the y-axis is labeled as tempo. Processor 120 may then create a data point for each song that has corresponding information stored in database 300 on display 410. The location for a data point on the x axis may be based on the particular genre of the song and the location for the data point on the y axis may be based on the tempo of the song. Additional labels (not shown in FIG. 4A) may be used to display the particular genre at various points on the x-axis. For example, labels for pop, rock, jazz, classical may be provided on the x-axis. Alternatively, the various genres represented on the x-axis may be known or selected by the user. For example, the user may input a selection to a graphical user interface (GUI) provided by system 100 that allows the user to select a particular genre for display 410. Alternatively, the user may use a control button in controls area 420 or elsewhere on system 100, such as input device 160, to scroll along the x-axis and processor 120 may automatically provide different genres on the x-axis. Processor 120 may also display the particular genre in either display 410 or text window 422.

In the example illustrated in FIG. 4A, the location of a data point on the y-axis may be based on the tempo of the song, such as the beats per minute. The lower portion of the y-axis may represent slower songs (i.e., fewer beats per minute) and the upper portion of the y-axis may represent faster songs (i.e., higher beats per minute). A user of system 100 may then view a number of media files, songs in this example, stored by system 100 via display 410. As illustrated in FIG. 4A, a large number of songs may be represented as dots or stars and the user may be able to view display 410 and easily discern various patterns associated with songs he/she has stored on system 100. In some implementations, the titles of the songs or abbreviated versions of the titles may be displayed on display 410 next to the appropriate data points.

Graphical representation 400 also allows the user to select a particular song in display 410. For example, suppose the user wishes to select the dot labeled 412 in FIG. 4A. The user may select the dot via input device 160 (act 240). In this example, input device 160 may include a cursor control. Alternatively, a joystick or some other input device may be used to move a pointer/cursor over a particular song in display 410 and allow the user to select the song.

After the user has selected the particular dot, processor 120 may provide an indication that the dot has been selected. For example, processor 120 may visually highlight this dot to the user, such as provide a halo/highlighted area around the dot, as illustrated in FIG. 4A. Alternatively, or in addition to the halo around the dot, processor 120 may highlight the dot and/or halo with a different color, make the dot brighter, make the dot larger, etc. In each case, one or more visual indicators may be provided so that a user knows that the dot has been selected.

In addition, after the user has selected the dot, controls area 420 may include information regarding the song. For example, as illustrated in FIG. 4A, text window 422 may display a title and artist/group associated with the selected dot/song. Text window 422 may also include information identifying the tempo and genre of the song. Text window 422 may also include other information associated with the song, such as the elapsed time.

In an exemplary implementation, once the user has selected a particular song, processor 120 may begin automatically playing a portion of the selected song (act 240). For example, processor 120 may access database 300 and identify an entry for the selected song. Processor 120 may then identify the information in snippet field 380 that identifies a location in the selected song, such as the chorus, hook line, etc. Processor 120 may then begin playing the song at the location identified in snippet field 380. In an exemplary implementation, processor 120 may play a predetermined portion (e.g., 10 seconds, 15 seconds, etc.) beginning at the location in the song identified in snippet field 380. This may allow the user to quickly determine if he/she wants to hear the entire song.

If the user decides he/she wants to hear the whole song, the user may press a control input on, for example, controls area 420 (act 250). For example, the user may select play button 424 and/or use input device 160 to select a play function and processor 120 may play the selected song starting at the beginning of the song (act 250). Alternatively, the user may decide that he/she does not want to hear the song and may select button 426 and/or a stop function via input device 160 to stop the song/snippet. The user may also use input device 160 to select another dot in display 410. The user may further scroll left and right via input device 160 to locate additional dots representing more songs. In this case, the background of display 410 may move to create an effect that the sky is moving and new dots/stars are becoming visible.

Figure 4B:
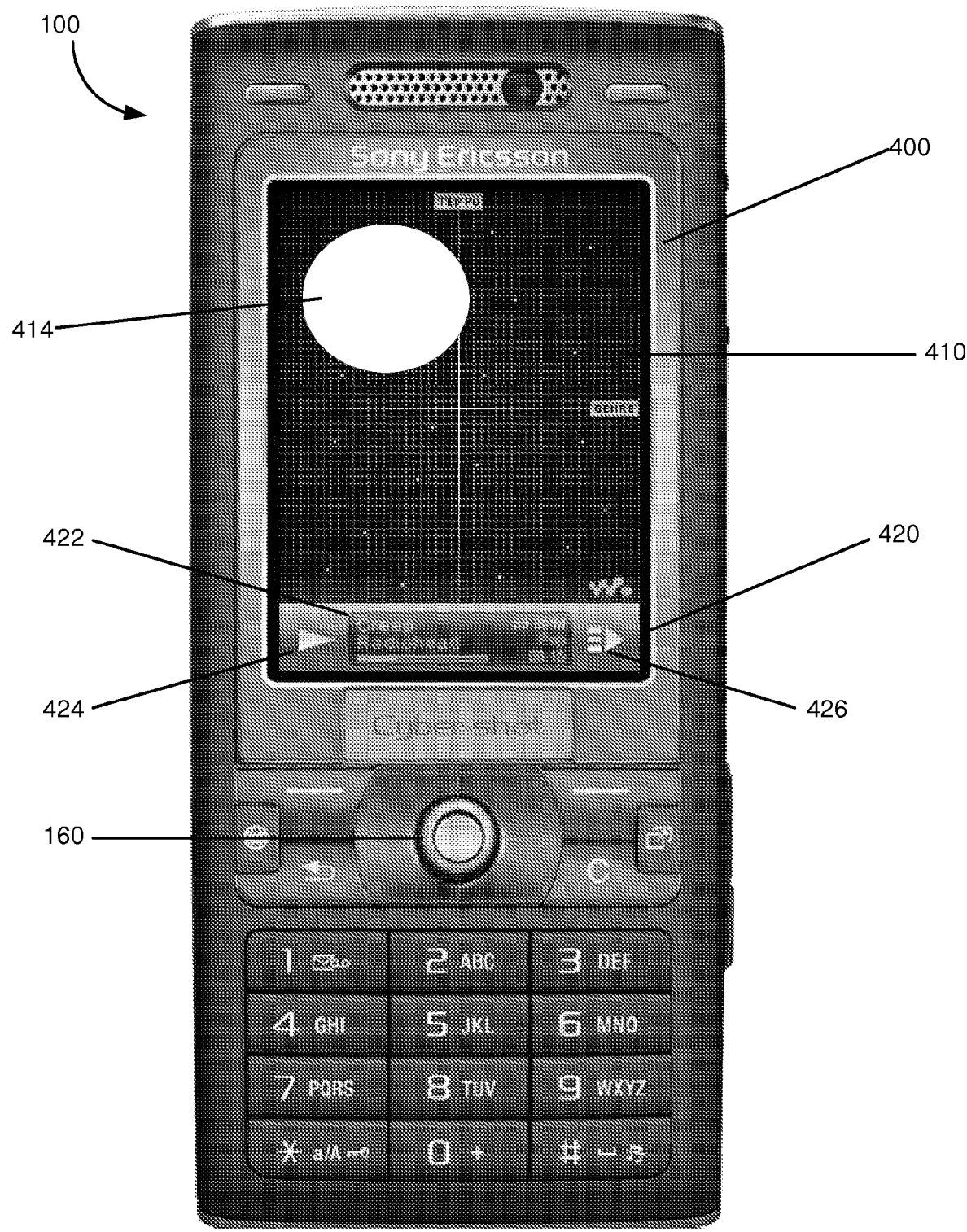

When a new dot is selected, processor 120 may immediately stop playing the snippet and begins playing a snippet of the newly selected song. In addition, text window 422 may display the particular information (e.g., title, artist, genre, tempo) for the newly selected song. The user may also select a number of songs on display 410 to create a playlist of songs he/she wishes to play (act 260). For example, the user may use input device 160 to identify a number of dots illustrated in display 410. In one implementation, the user may use input device 160 to expand an area around a particular dot to encompass a number of dots in display 410, as illustrated by area 414 in FIG. 4B. Area 414 is shown in FIG. 4B as being an oval. In other implementations, other shapes, such as rectangular shapes, irregular shapes may be used. In addition, area 414 may be highlighted using color or other visual indicators. In still other implementations, only the perimeter of area 414 may be visible or highlighted to allow the user to see the dots inside area 414. In alternative implementations, the user may select individual dots in display 410 via input device 160.

In each case, after the user has created the shape encompassing a number of dots or selected particular dots individually, processor 120 may create a playlist based on the identified dots (act 260). Processor 120 may store this playlist for retrieval by the user at a later time. Alternatively, processor 120 may begin playing the songs identified in the playlist.

FIGS. 4A and 4B illustrate an exemplary display 410 provided to the user. In this example, display 410 is a graphical representation of dots graphed according to various items of information associated with the song (i.e., genre and tempo in this example). System 100 may include a graphical user interface (GUI) that allows the user to select the particular items illustrated on the x-axis and y-axis. For example, the GUI may allow the user to select artist and year. Processor 120 may then provide a display in which songs are graphed according the artist and year in which the song was recorded. In this manner, system 100 allows the user to select the particular criteria with which he/she wishes to categorize and display his/her music.

Figure 4C:
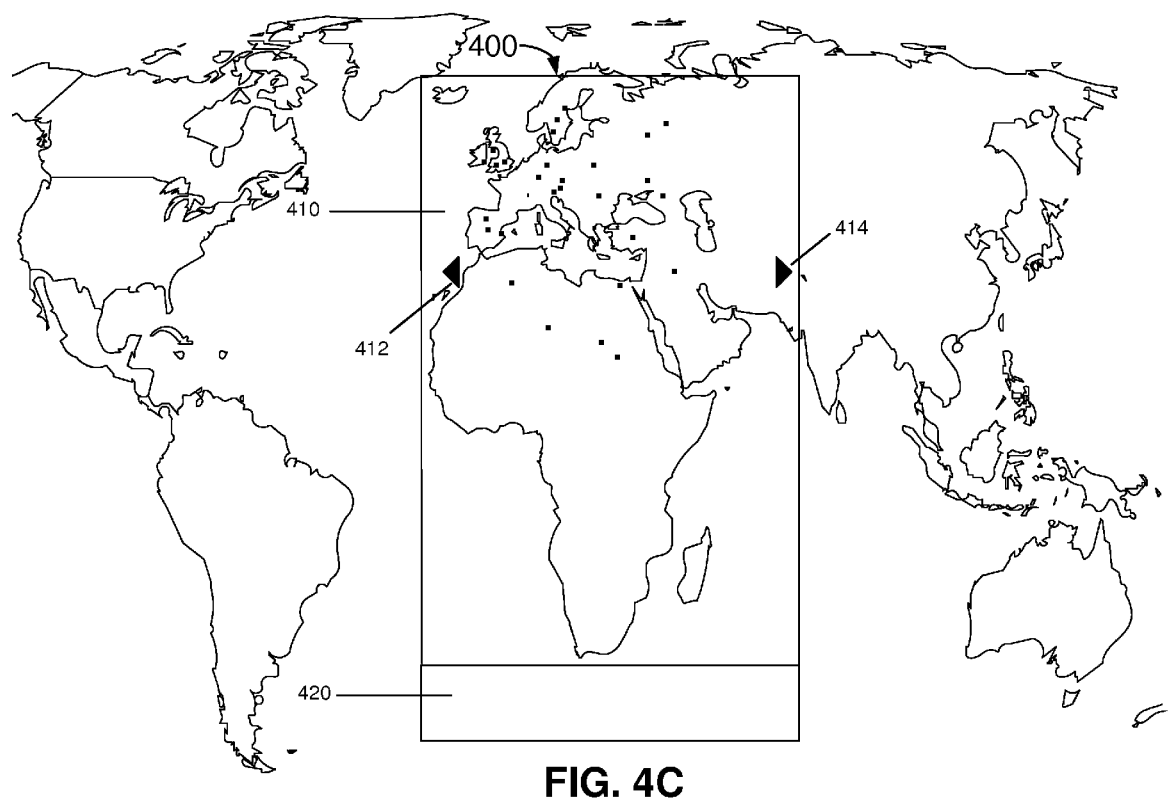

In addition, display 410 illustrates a number of dots/stars displayed to a user. In other implementations, display 410 may include other scenes/backgrounds. For example, FIG. 4C illustrates an exemplary graphical representation 400 that includes display 410 and control area 420. In this example, the songs are displayed over a portion of a map of the world and the songs may be displayed as dots according to the country information stored in field 330 (FIG. 3). That is, a song recorded by an artist/group from Sweden may be represented by a dot in Sweden. Similarly, a song recorded by an artist/group from England may be represented by a dot in England. Alternatively, the dots may represent the location (e.g., the country, state, city) where system 100 was located when system 100 played a particular song. In the example illustrated in FIG. 4C, only portions 410 and 420 would be displayed to the user. The remaining portion of the map is provided for illustrative purposes.

A user may select a particular dot and information associated with the song represented by the dot may be displayed in control area 420 in a manner similar to that discussed above with respect to FIG. 4A. In addition, processor 120 may begin playing a snippet of the selected song. Still further, the user may create a playlist of songs by selecting a number of dots (e.g., encircling a number of dots) in a similar manner as that described above with respect to FIG. 4B.

The user may also use left arrow 412 or right arrow 414 as controls to view songs associated with other parts of the map/world. For example, assume that the user selects right arrow 414. In an exemplary implementation, the background (i.e., the map of the world) illustrated in FIG. 4C would move to the right as if a globe were turning. The user may decide to release right arrow 414 when the map of North America is displayed. In this manner, the user is provided with a visual effect that he/she is spinning a globe to locate particular songs recorded by artists ill different parts of the world.

Additional themes may be used to provide backgrounds and/or scenes that may be provided to the user. For example, an underwater theme/scene may be displayed by system 100. In this case, the songs may be displayed as bubbles or fish in the water. In other implementations, various geometrical or abstract shapes may be used to represent songs and/or albums. The particular backgrounds, scenes and/or themes that processor 120 provides may be selected by the user via a GUI, as described in more detail below.

Figure 5:
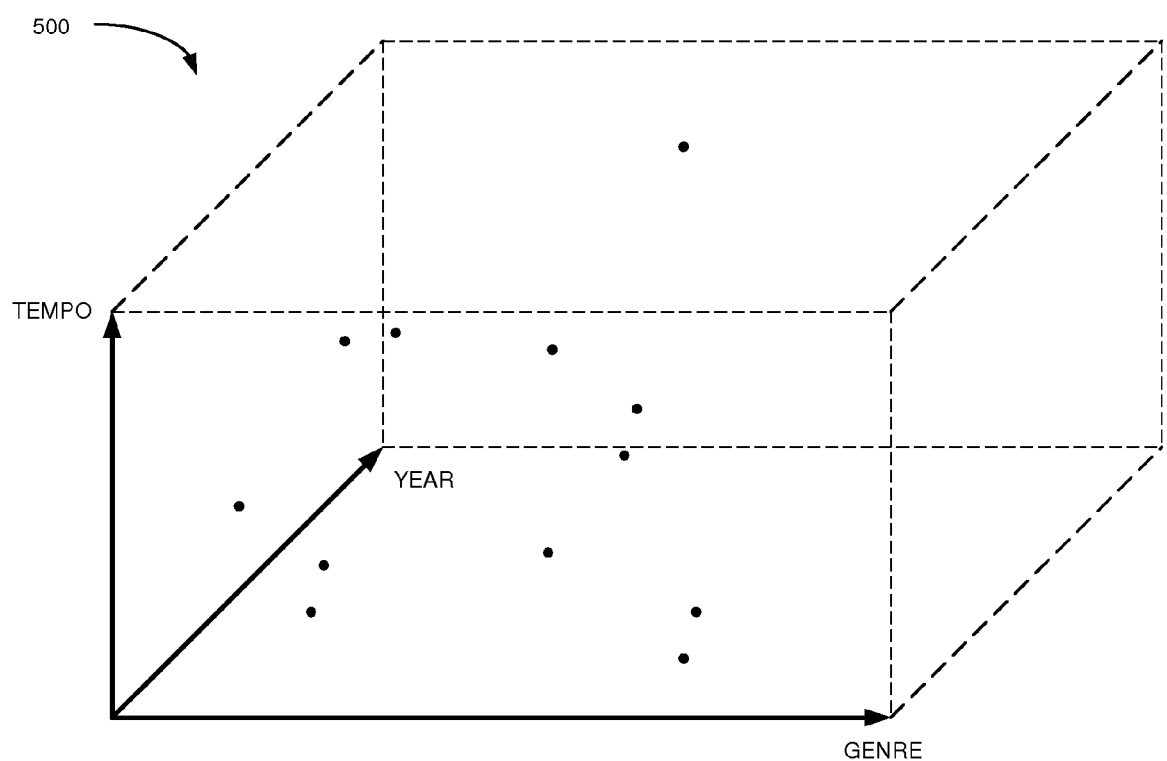
FIG. 5 illustrates an exemplary three dimensional display provided by the system of FIG. 1.

In addition, the displays illustrated in FIGS. 4A-4B are two dimensional and the display in FIG. 4C is essentially one dimensional (i.e., the map in FIG. 4C provides one piece of information (location) associated with the songs). In other implementations, processor 120 may display information in three or more dimensions. For example, FIG. 5 illustrates a display 500 that is 3-dimensional. Referring to FIG. 5, display includes a genre label on the x-axis, a tempo label on the y-axis and a year label on the z-axis. In this example, processor 120 may graph each dot at the appropriate location on the x-axis, y-axis and z-axis based on the information stored in database 300. Similar to the discussion above with respect to FIG. 2, the user may select a dot representing a song and processor 120 may play a snippet of the song and display information associated with the song in a control area (not shown in FIG. 5). Processor 120 may also allow the user to select particular songs to create a playlist.

Figure 6:
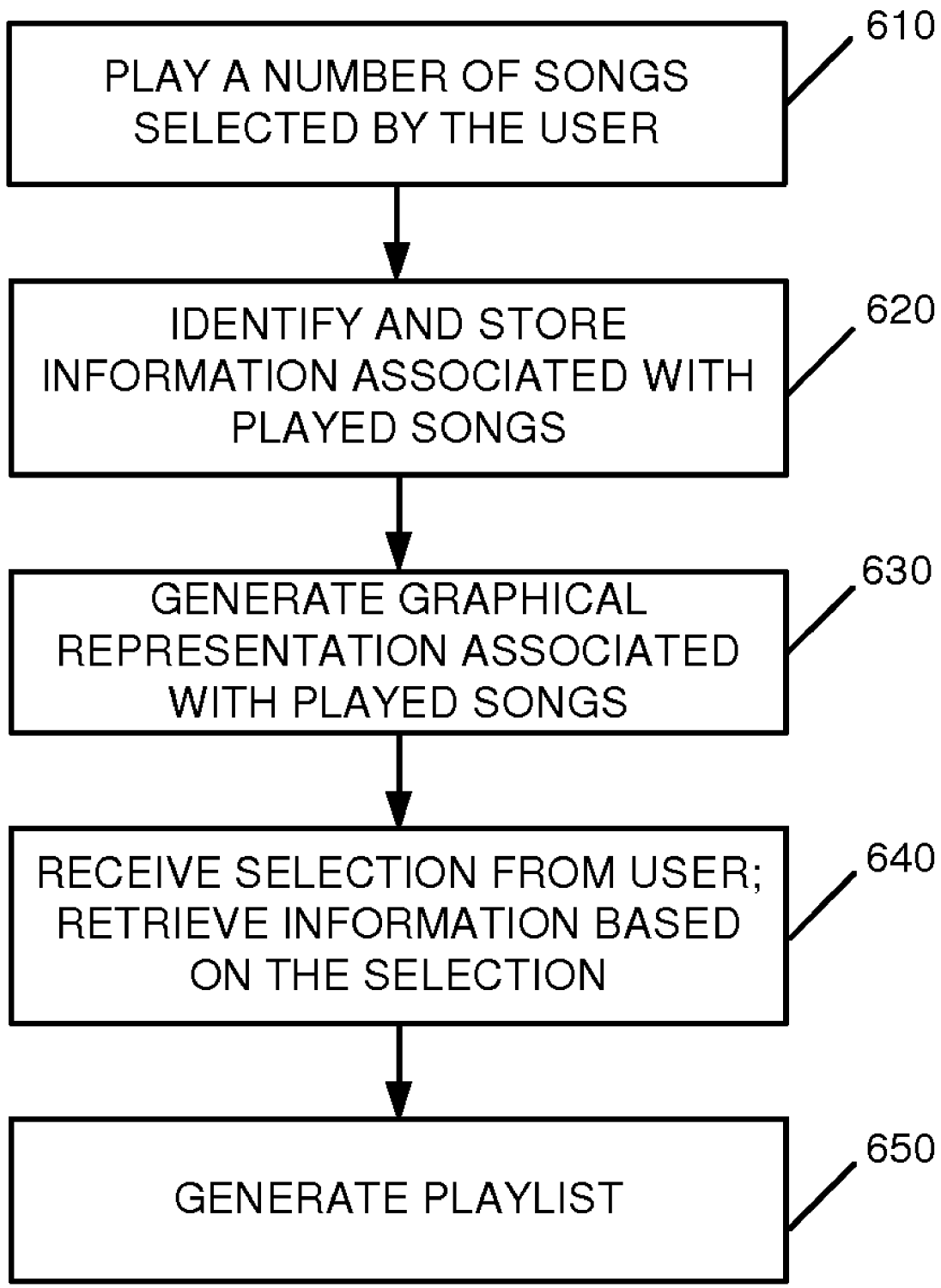
FIG. 6 is a flow diagram illustrating exemplary processing associated with displaying information to a user.

System 100 may also allow the user to view information associated with songs played by system 100. FIG. 6 illustrates exemplary processing associated with viewing such information. Referring to FIG. 6, processing may begin when system 100 powers up. Assume that the user plays a number of songs over the course of a day (act 610). Processor 120 may identify and store information associated with each song played (act 620). For example, processor 120 may store metadata, such as the information illustrated in database 300, with the stored song. Processor 120 may continue to store information associated with songs played by the user over a number of days, such as a week, month, etc.

Figure 7:
FIGS. 7-12 illustrate exemplary displays provided by the system of FIG. 1.

In an exemplary implementation, processor 120 may generate a graphical representation of songs played by the user over a period of time (act 630). For example, processor 120 may generate a calendar illustrating each day in a month, as illustrated in FIG. 7. Referring to FIG. 7, display 700 may include a calendar for a single month, such as June in this example. Suppose that the user would like to view music he/she listened to on a particular day. In this case, the user may use input device 160 (not shown in FIG. 7) to select the particular day via display 700 (act 640). For example, suppose that the user would like to view songs he/she listened to on June 6. In this case, the user may select the day June 6 in the calendar using input device 160. In response, processor 120 may highlight the number 6 with a bold font and/or increase the size of the number 6, as illustrated in FIG. 7. Alternatively, or in addition to the bolding/size increase, processor 120 may provide color to the selected day/number, such as highlight the number 6 in red or provide some other indicator that June 6 has been selected.

After receiving the selection, processor 120 may retrieve information identifying the list of songs played by system 100 on the sixth of the month (act 640). The retrieved information may include a number of items, such as the title and artist of each song played on the sixth. Additional information associated with the song, such as tempo, genre, year, etc., may also be retrieved and displayed to the user in alternative implementations.

Processor 120 may display the list of songs to the user via output device 170 (FIG. 1), which may be a display screen. The user may view the songs and create a playlist based on the songs displayed to the user. For example, the user may provide an input to select all of the displayed songs or select particular ones of the displayed songs via input device 160. Processor 120 may then generate and store a playlist for the user's retrieval at a later time (act 650). Alternatively, the information stored by processor 120 for each day of the month may act as a playlist for retrieval by the user at a later time.

Figure 8:
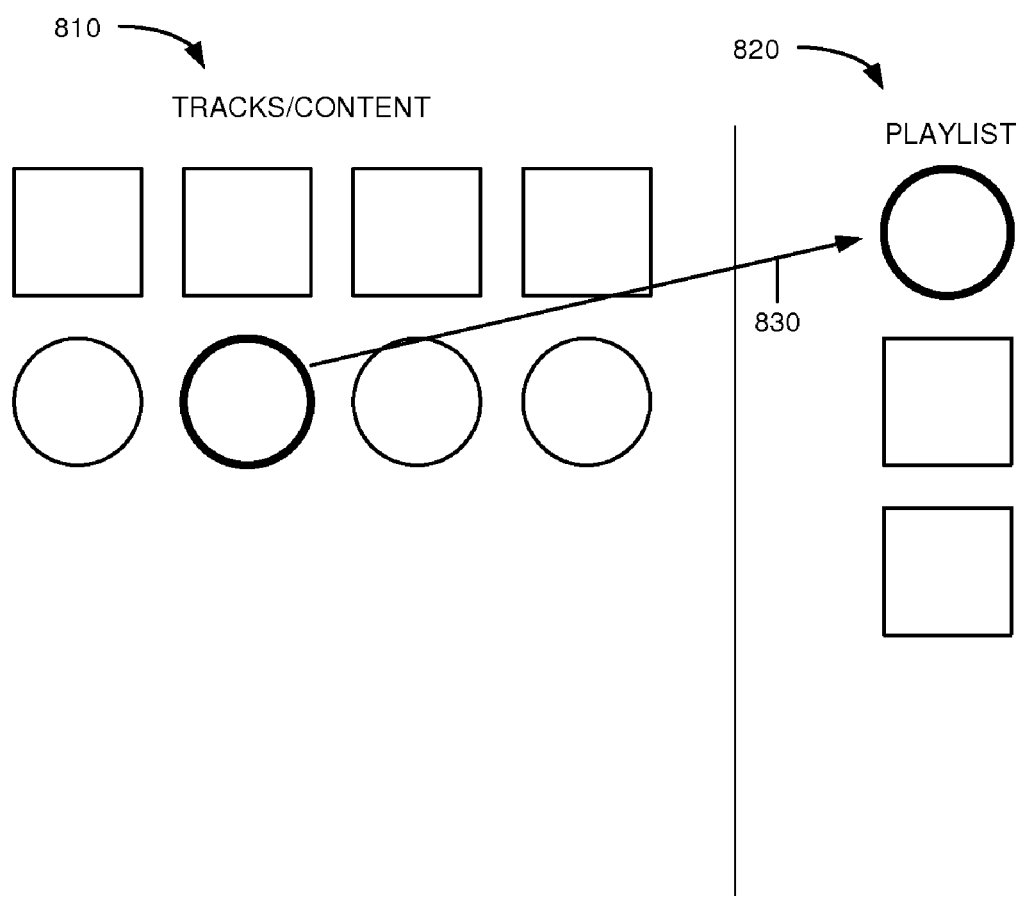

In an alternative implementation, processor 120 may generate a graphical display illustrating various tracks/content played by system 100. For example, FIG. 8 illustrates an exemplary display 800 which includes a tracks/content area 810 and a playlist area 820. The information illustrated in area 810 represents media files, such as songs, played by system 100 over a period of time. The squares in tracks/content area 810 may correspond to a particular genre of music, a particular tempo, a particular artist or a combination of these or other items associated with the particular media file. The circles in content area 810 may represent different genres, tempos, artists, etc. Any number of other icons/symbols may alternatively be used to represent various media/content. Labels associated with the particular icons illustrated in tracks/content area 810 are not shown in FIG. 8 for simplicity.

Suppose that the user would like to select one or more of the icons representing a media file in tracks/content area 810 to create a playlist. The user may use input device to select particular file represented in tracks/content area 810. In response, processor 120 may highlight the selected content, as illustrated by the bolded circle in FIG. 8 representing a particular media file or track.

In an exemplary implementation, the user may preview the particular content/track illustrated in tracks/content area 810 before moving it to playlist area 820. For example, the user may select the particular track (e.g., by clicking one time on the track icon) to hear a snippet of the track in a manner similar to that described above with respect to FIG. 2. If the user likes the track/content, he/she may select the particular track again (e.g., click a second time on the track icon) so that the track gets moved to playlist area 820, as illustrated by arrow 830 in FIG. 8. Alternatively, the user may click and drag the track to playlist area 820. In this manner, the user may create a playlist for retrieval at a later time or for immediate play.

Figure 9:
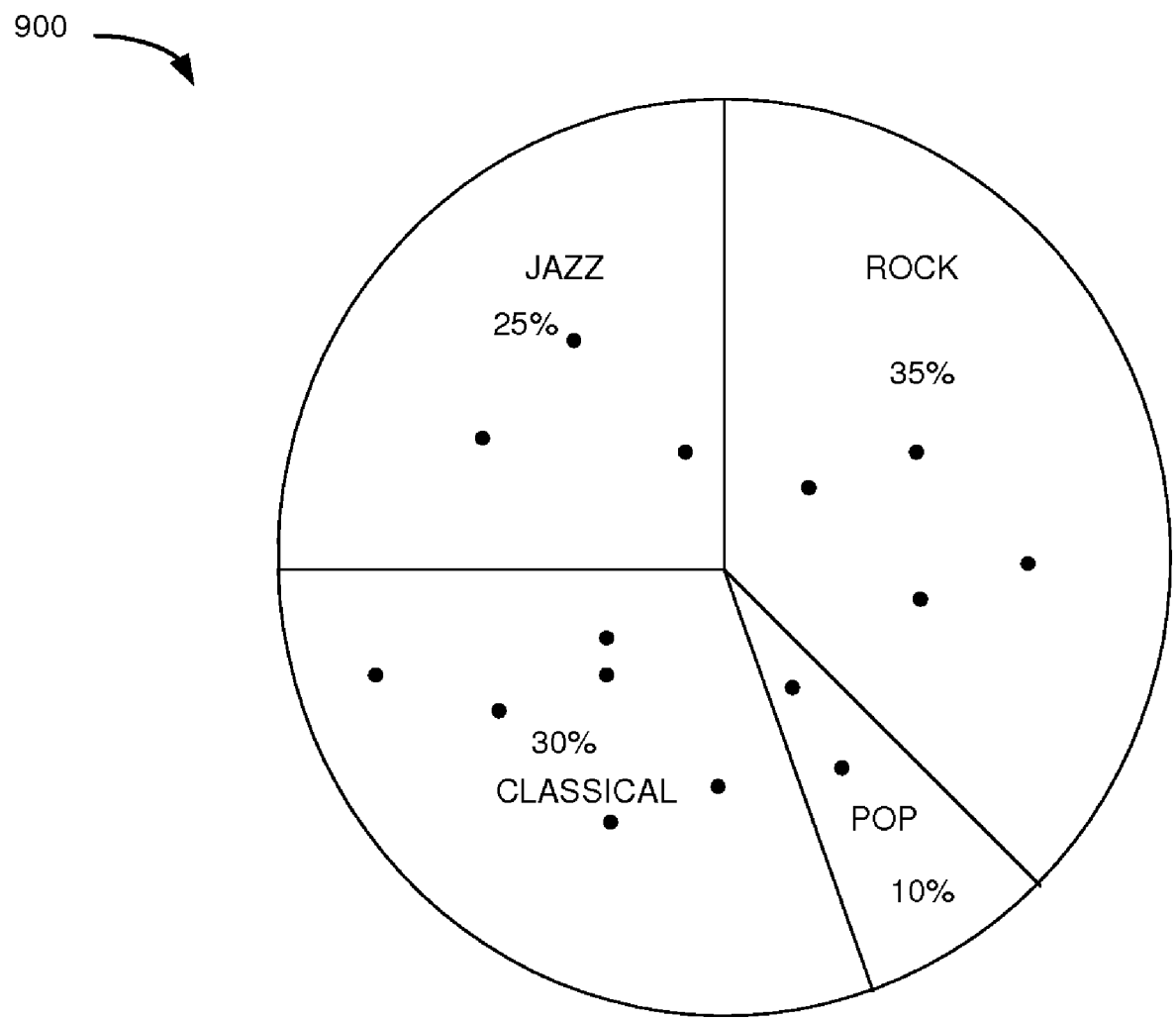

As another example, processor 120 may create a pie chart representing songs played by system 100 over a period of time. For example, FIG. 9 illustrates exemplary display 900 that may be provided to the user via output device 170. Referring to FIG. 9, display 900 includes a number of portions labeled as pop, rock, jazz, classical along with percentage indicators. In this example, the percentages may indicate the number of songs played by system 100 in each genre over a period of time. In addition, in this implementation, different colors may be used for the dots to denote different days on which the songs were played. For example, all dots in red may represent songs played on a first day and all dots in blue may represent songs played on a second day. In this manner, display 900 allows the user to view songs played in various genres over a period of time and to also see which songs were played on each particular day. Display 900 may also allow the user to select particular dots and preview a snippet of the song. The user may also select a number of the dots to create a playlist for retrieval at a later time.

Figure 10:
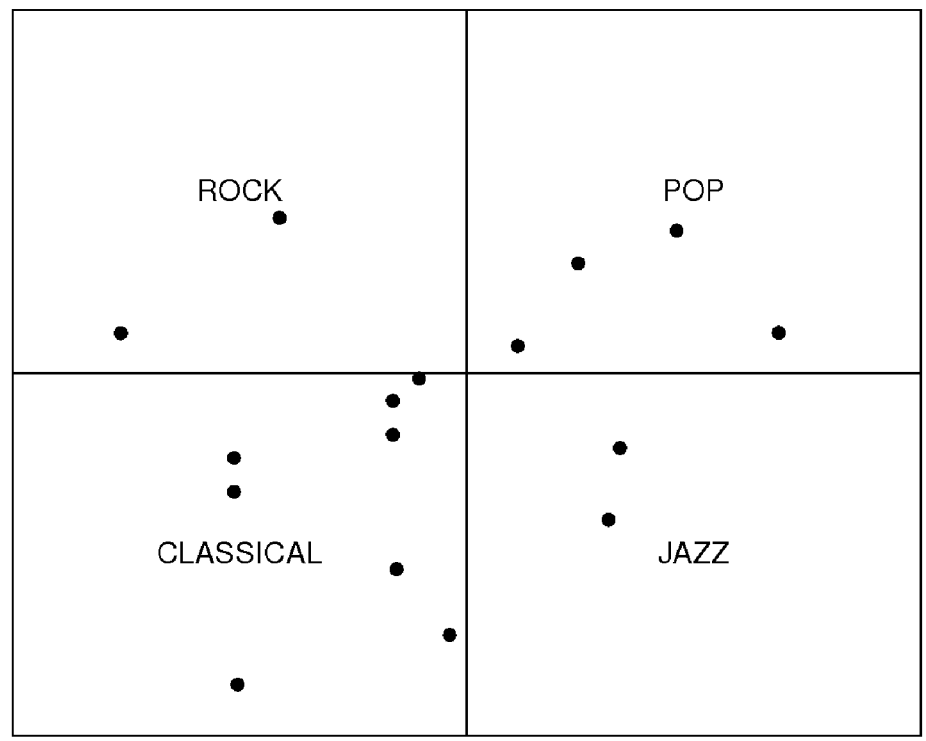

In still another implementation, processor 120 may create a graph with a number of quadrants representing various genres of music. For example, FIG. 10 illustrates exemplary display 1000 that may be provided to the user via output device 170. Referring to FIG. 10, display 1000 includes four quadrants labeled as pop, rock, jazz and classical. Other genres may also be included in display 100. In this example, each dot may represent a song played by system 100 in that particular genre. In addition, various colors may be used to represent the number of times that a particular song was played. For example, all dots in red may represent songs played that were played at least four times over a single week, month, etc. Songs played only once over the period of time may be displayed in black, songs played twice may be displayed in green, etc. In this manner, the display 1000 allows the user to view songs played in various genres over a period of time and to also see which songs were played most often. Display 1000 may also allow the user to select particular dots and preview a snippet of the song. The user may also select a number of the dots to create a playlist for retrieval at a later time. In one implementation, the user may select all dots in a particular color (e.g., red) to generate a playlist of songs that he/she has played most often.

In addition, in display 1000, songs that have not been played often or have not been played for a long period of time may be showed in a grayed out or much lighter font/style. These songs may no longer be stored on system 100. In one implementation, display 1000 may include a link to an online music store. For example, the user may select a song that is no longer stored by system 100 and may wish to purchase/download the song. The user may select such a song and system 100 may automatically link system 100 to the online music store. The user may then decide whether to purchase/download the song from the online music store.

Figure 11:
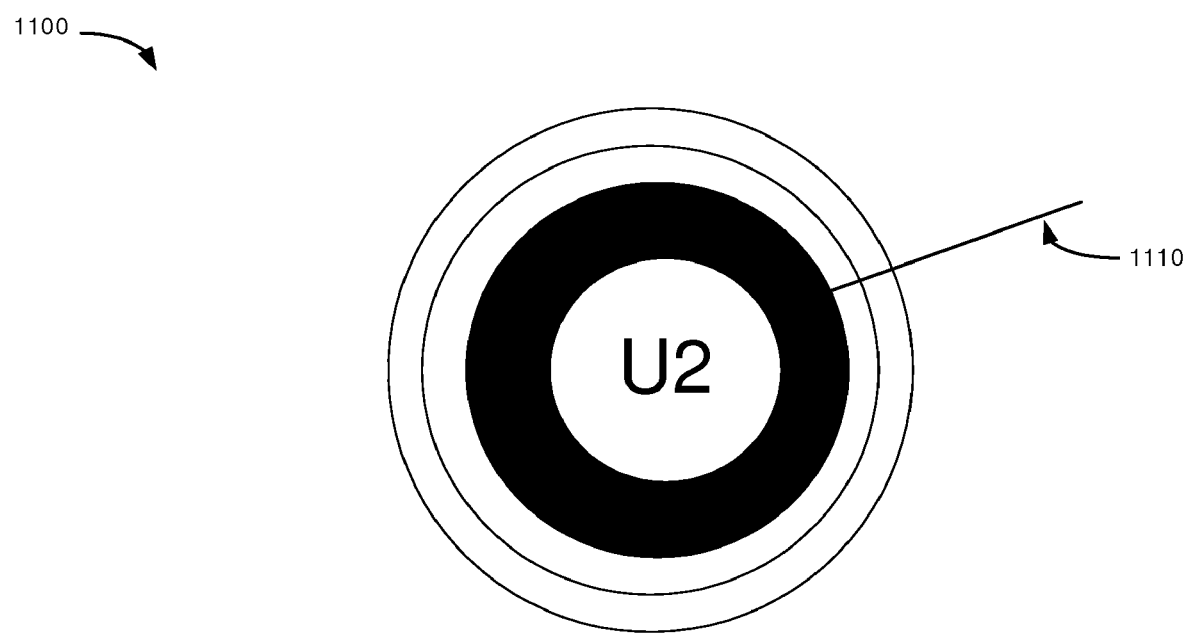

As described above, a playlist may be a list of songs with titles and/or artists. In some implementations, processor 120 may generate a graphical playlist that represents an album. For example, FIG. 11 illustrates exemplary display 1100 that may be provided to the user via output device 170. Referring to FIG. 11, display 1100 includes a graphical representation of a record or album with a number of tracks. The particular tracks associated with display 1100 may represent a playlist created by the user in any number of manners, such as any of the exemplary implementations described herein. In this example, suppose that the user wishes to play a particular track. In this case, the user may move a stylus or pointer, labeled 10 in FIG. 11, to point to a particular track that the user wishes to play. When the stylus is moved to a particular track, the track may be highlighted and the center of display 1100 may display the artist and/or other information associated with the track. In addition, when pointer 1110 is moved to identify the particular track, processor 120 may play a snippet of the song starting at, for example, the portion identified in field 380 (FIG. 3). The user may then decide to play the entire song or skip to another song.

Figure 12:
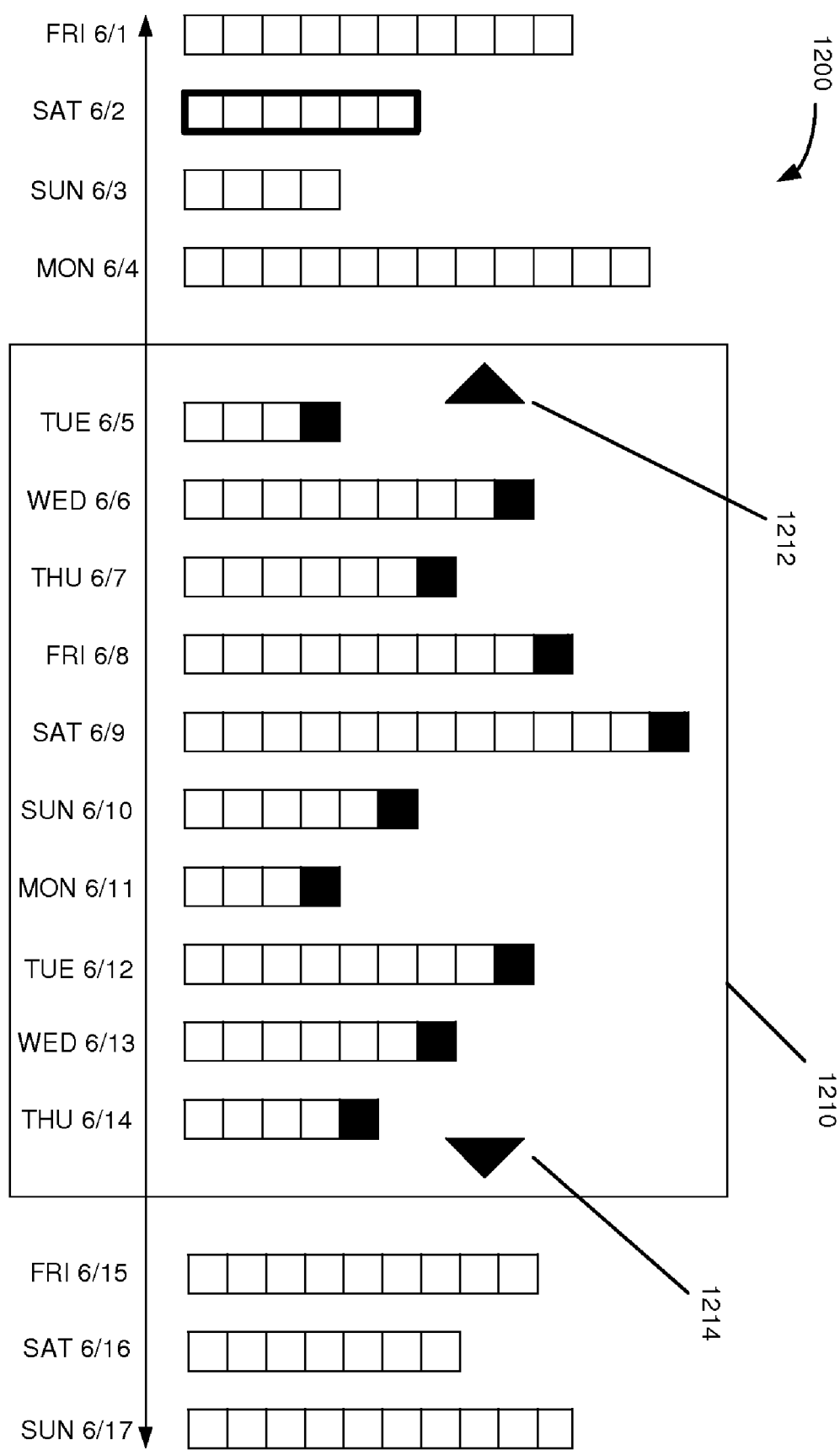

As still another example, system 100 may generate another stylized playlist. For example, FIG. 12 illustrates an exemplary display 1200 representing songs played over a period of time. Referring to FIG. 12, display 1200 is designed to look like a graphic equalizer and includes a timeline on the x-axis with a number of discrete days illustrated. The portion of display 1200 illustrated in box 1210 may be displayed to the user via output device 170. Directional arrows 1212 and 1214 may be used to move the timeline to display different days/periods of time.

In an exemplary implementation, each box may represent a song that was played by the user for longer than a predetermined period of time (e.g., 30 seconds). In addition, a song played most often during a given day may be shown highlighted or in bold, as illustrated in FIG. 12. In display 1200, the songs played most often during each day may also be illustrated at higher portion of the list/bar graph for that particular day. In other words, songs played less frequently are illustrated as the lower boxes and songs played more often are illustrated on top of the less frequently played song. In this manner, the song at the top of the list/bar graph for a particular day may represent the most frequently played song for that particular day.

Assume that the user wishes to create a playlist of songs played most often over a period of time. In this example, the user may simple select the bolded boxes illustrated in display 1200. Processor 120 may then retrieve information associated with each of the selected songs to create a playlist for the user.

As another example, suppose that the user wishes to retrieve all the songs played on a particular day, such as songs that he/she may have played to friends at a party on June 2. In this case, the user may scroll to the particular day using arrow 1212 and select the particular day on the timeline (i.e., x-axis) via input device 160 (not shown in FIG. 12). In response, processor 120 may highlight that particular day, as illustrated in FIG. 12. Processor 120 may also generate a playlist for the user based on the songs played on June 2.

In the examples described above, a dot, star or other icon may be used to represent a media file, such as a song. In other implementations, each dot, star, icon, etc., may represent an album. In this case, the user may select a particular dot and processor 120 may begin playing a first song in the album.

System 100 as described above may allow the user to view songs/playlists in a graphical manner using dots or other symbols/icons. In still another implementation, system 100 may include icons, such as album art associated with a particular artist. In this case, the playlist for a particular day may be displayed as a montage of pictures. The user may then select a particular picture in the montage to play a particular song by the corresponding artist.

Viewing stored media files/playlists in graphical form allows the user to view much more information than would be possible via a text listing. In addition, the user may scroll through a graphical display when a very large number of media files cannot be viewed on a single display screen. Viewing graphical representations may allow the user to identify various trends associated with his/her listening habits.

In some implementations, as described briefly above, the graphical representation displayed to the user, such as display 410, may include a link (not shown) to an online music store. In one implementation, the user may download music from the online music store based on information provided in display 410. For example, suppose that a user has circled an area on display 410 that corresponds to a particular genre and tempo of music. In this case, an application executed by system 100 may contact the online music store, which may provide a list of other songs that correspond to the particular genre and tempo. The list may be received by system 100 and displayed on output device 170. The user may then decide to purchase one or more of the displayed songs from the online music store.

Aspects of the invention described above allow system 100 to display media files to a user in a graphical format. In implementations consistent with the invention, system 100 may allow the user to customize the particular displays based on his/her preferences. For example, processor 120 may provide a GUT with a menu of options for the user. The menu may allow the user to select what information will be displayed to the user via output device 170. For example, the user may decide to use the background/theme illustrated in FIG. 4A, as opposed to the background/theme illustrated in FIG. 4C. In addition, the user may select what items of information stored by system 100 that he/she would like categorized for particular media files. For example, the user may select any combination of items in database 300 (e.g., genre/tempo, year/genre, tempo/year, genre/country, etc). The menu may also allow the user to select time periods associated with displayed information, such as whether the display should correspond to a week, a month, a year, etc. The menu may also allow the user to select colors associated with information displayed via output device 170. In this manner, system 100 provides the user with a customizable graphical representation of media stored by system 100 and/or media played by system 100 that provides the desired information in the desired format.

CONCLUSION

Implementations consistent with the invention allow a user to view information, such as media files, in a graphical manner. Advantageously, this may allow the user to quickly identify information of interest. In addition, aspects consistent with the invention allow a user to play snippets of media files at particular points in the media file that may be most relevant to a user. This may help a user quickly determine whether to play the complete media file. In addition, aspects consistent with the invention enable a user to select particular media files (e.g., songs) in a very efficient, user-friendly manner. This may help increase a user's satisfaction level with respect to use of his/her media player.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been mainly described in the context of a system playing music files with a number of exemplary displays. Other displays may alternatively be used. For example, a simple timeline display may be used to allow the user to view songs he/she played over a number of weeks, months, years, etc. The user may scroll up/down, left/right, etc., to view songs played over a long period of time. In addition, aspects of the invention may be used to display information associated with other types of media, such as video files (e.g., television shows, movies, etc.), pictures, video games, etc.

For example, if the user has stored a number of movies in system 100, system 100 may allow the user to view icons representing the various movies. Further, the user may view a snippets or thumbnails of a particular movie by selecting a particular icon.

In addition, if the user has stored a number of image files/pictures he/she has taken over a period of time, system 100 may allow the user to view the pictures via displayed icons. In one implementation similar to that illustrated in FIG. 4C, each dot may identify the location where a picture stored in system 100 was taken. For example, suppose that system 100 includes a camera and/or video recorder. Further assume that the user took a picture with system 100 in Florida. Processor 120 may store an icon representing that particular picture on a map in Florida. In this manner, the user may go back later and retrieve pictures he/she took at various locations. Therefore, system 100 may provide graphical representations of any type of media content played by system 100 and/or stored by system 100.

Further, in some implementations, various output devices associated with system 100 may be used to further enhance the user's experience associated with finding and/or playing media files. For example, a vibration mechanism included in system 100 (e.g., output device 170) may be actuated when a particular media file is played. In addition, a particular media file, such as a particular song, may be played to the user at a higher loudness level based on its location in a display and/or may be played in a particular speaker, headphone and/or channel depending on its location in a display.

In addition, the graphical representations provided to a user may represent content retrieved locally from system 100. In some implementations, the content may represent content accessed from an external device, such as a server accessible to system 100 via, for example, a network.

Further, while series of acts have been described with respect to FIGS. 2 and 6, the order of the acts may be varied in other implementations consistent with the invention. Moreover, non-dependent acts may be performed in parallel.

It will also be apparent to one of ordinary skill in the art that aspects of the invention, as described above, may be implemented in any device/system capable of playing various media (e.g., music, video and/or multimedia files). For example, in the implementation described above with respect to FIGS. 4A and 4B, aspects of the invention may be implemented in a mobile terminal/telephone, such as a cellular telephone. In addition, aspects of the invention may be implemented in a digital media player, a personal digital assistant (PDA), a computer or any other device with media-playing capability. Aspects of the invention may also be implemented in methods and/or computer program products. Accordingly, the invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A device, comprising:
   logic to store a plurality of media files;
   a display to present a graphical representation illustrating information associated with the plurality of media files; and
   an input device to receive input from a user identifying at least a portion of the plurality of media files represented in the graphical representation, where the logic is further to:
   generate a playlist, based on the identified portion of the plurality of media files; and
   associate at least one of the identified portion of the plurality of media files with at least one of a plurality of visual color indicators that indicates, based on a color of the at least one of a plurality of visual color indicators, a number of times the at least one of the identified portion of the plurality of media files has been played by the user.

2. The device of claim 1, where the graphical representation comprises a graph, a first axis of the graph being associated with a first item of information and a second axis of the graph being associated with a second item of information.

3. The device of claim 2, where the first item of information and second item of information each comprises at least one of one of a genre of music, a tempo, an artist or a year.

4. The device of claim 1, where the input from the user comprises:
   graphical input enclosing a number of points illustrated in the graph, where each of the number of points is associated with one of the plurality of media files.

5. The device of claim 1, where the input received from the user comprises:
   input highlighting a number of points illustrated in the graph, where each of the number of points is associated with one of the plurality of media files.

6. The device of claim 1, where the logic is further to display at least one of the at least a portion of the plurality of media files in the playlist using visual indicators.

7. The device of claim 6, where the visual indicators comprise at least one of color, highlighting or bolding.

8. The device of claim 1, where the graphical representation comprises dots, stars or geometrical shapes, each of the dots, stars or geometrical shapes representing at least one of the plurality of media files.

9. The device of claim 1, where the graphical representation comprises a map, the map including indicators representing at least one of the plurality of media files.

10. The device of claim 1, where the graphical representation comprises artwork associated with at least one of the plurality of media files.

11. The device of claim 1, where the device comprises a mobile telephone.

12. The device of claim 1, where the logic is further to:
    provide a link to a music vendor.

13. A method, comprising:
    storing, on a device, a plurality of media files;
    displaying, on the device, a graphical representation illustrating information associated with the plurality of media files;
    receiving, at the device, an input from a user identifying at least a portion of the plurality of media files represented in the graphical representation;
    generating, at the device, a playlist based on the at least a portion of the plurality of media files,
    where one or more of the at least a portion of the plurality of media files is associated with at least one of a plurality of visual color indicators that indicates, based on a color of the visual color indicator, a number of times the one or more of the at least a portion of the plurality of media files has been played by the user.

14. The method of claim 13, where the graphical representation comprises a graph, a first axis of the graph being associated with a first piece of information and a second axis of the graph being associated with a second piece of information.

15. A computer-readable memory device having stored thereon a plurality of sequences of instructions which, when executed by at least one processor, cause the at least one processor to:

store, on a user device, a plurality of media files;

display, on the user device, a graphical representation illustrating information associated with the plurality of media files;

receive input from a user selecting at least one of the plurality of media files; and generate. at the device, a playlist based on the at least a portion of the plurality of media files, where one or more of the at least a portion of the plurality of media files is associated with at least one of a plurality of visual color indicators that indicates, based on a color of the visual color indicator, a number of times the one or more of the at least a portion of the plurality of media files has been played by the user.

16. The device of claim 7, where the visual indicators comprise color that indicate a number of times the at least one media file has been played.

* * * * *